United States Patent
Kawano

(10) Patent No.: US 8,400,684 B2
(45) Date of Patent: Mar. 19, 2013

(54) IMAGE PROCESSING AND FORMATION APPARATUS AND PROGRAM FOR CHANGING VALUES OF TARGET PIXELS SUBJECT TO COLOR TRAPPING AT CERTAIN POSITIONS

(75) Inventor: Hiroyuki Kawano, Ashigarakami-gun (JP)

(73) Assignee: Fuji Xerox Co., Ltd., Tokyo (JP)

( * ) Notice: Subject to any disclaimer, the term of this patent is extended or adjusted under 35 U.S.C. 154(b) by 421 days.

(21) Appl. No.: 12/855,287

(22) Filed: Aug. 12, 2010

(65) Prior Publication Data

US 2011/0188088 A1 Aug. 4, 2011

(30) Foreign Application Priority Data

Feb. 1, 2010 (JP) ................................. 2010-020161

(51) Int. Cl.
*H04N 1/58* (2006.01)
(52) U.S. Cl. ........ 358/3.26; 358/518; 358/534; 358/540
(58) Field of Classification Search .................. 358/3.06, 358/3.26, 518, 532, 534–536, 540
See application file for complete search history.

(56) References Cited

U.S. PATENT DOCUMENTS 8,004,718 B2 * 8/2011 Lacagnina et al. ........... 358/3.06
8,253,981 B2 * 8/2012 Eguchi .......................... 358/518
2006/0139353 A1 6/2006 Washio
2010/0259775 A1 * 10/2010 Sakamoto ...................... 358/1.9
2012/0189196 A1 * 7/2012 Li et al. .......................... 382/165

FOREIGN PATENT DOCUMENTS

JP A-2002-165104 6/2002
JP A-2006-180376 7/2006

* cited by examiner

*Primary Examiner* — Scott A Rogers
(74) *Attorney, Agent, or Firm* — Oliff & Berridge, PLC

(57) ABSTRACT

An image processing apparatus includes: a calculating unit that sequentially selects pixels as a target pixel, on binary image data composed of plural color plates for each printing color after having been subjected to halftone-dot processing, and calculates a characteristic amount in each of plural preset areas around the selected target pixel on the basis of states of pixels in the areas; a determination unit that determines, on the basis of the characteristic amount in each of the areas calculated by the calculating unit, whether or not the target pixel is a pixel to be subjected to overlay processing; a decision unit that decides, for each of the color plates, a position of a pixel to be referred to when changing a pixel value of the target pixel, on the basis of a halftone-dot processing attribute for each of the color plates; and a changing unit that, if it is determined by the determination unit that the target pixel is the pixel to be subjected to the overlay processing, changes the pixel value of the target pixel of the image data of the color plate for a printing color to be changed in pixel value in the overlay processing, to a pixel value at the position decided by the decision unit.

8 Claims, 19 Drawing Sheets

K PLATE

Y PLATE

C PLATE

M PLATE

FIG. 19
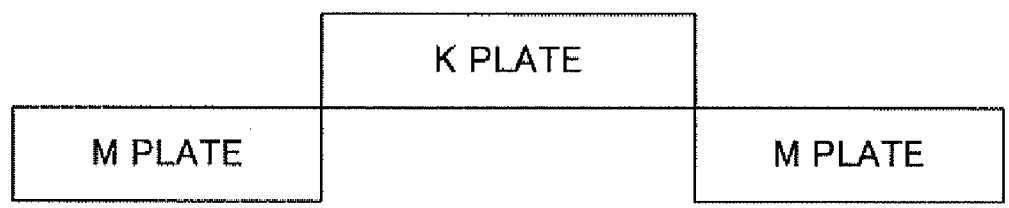
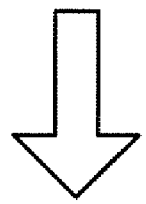
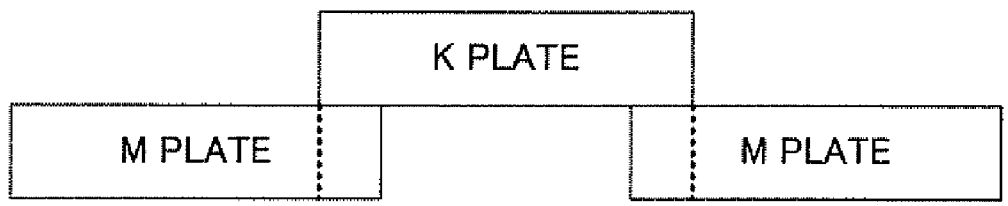

IMAGE PROCESSING AND FORMATION APPARATUS AND PROGRAM FOR CHANGING VALUES OF TARGET PIXELS SUBJECT TO COLOR TRAPPING AT CERTAIN POSITIONS

CROSS-REFERENCE TO RELATED APPLICATIONS

This application is based on and claims priority under 35 USC 119 from Japanese Patent Application No. 2010-020161 filed Feb. 1, 2010.

BACKGROUND

Technical Field

The present invention relates to image processing apparatuses, image forming apparatuses, and computer readable media staring programs.

SUMMARY

According to an aspect of the present invention, there is provided an image processing apparatus including: a calculating unit that sequentially selects pixels as a target pixel, on binary image data composed of plural color plates for each printing color after having been subjected to halftone-dot processing, and calculates a characteristic amount in each of plural preset areas around the selected target pixel on the basis of states of pixels in the areas; a determination unit that determines, on the basis of the characteristic amount in each of the areas calculated by the calculating unit, whether or not the target pixel is a pixel to be subjected to overlay processing; a decision unit that decides, for each of the color plates, a position of a pixel to be referred to when changing a pixel value of the target pixel, on the basis of a halftone-dot processing attribute for each of the color plates; and a changing unit that, if it is determined by the determination unit that the target pixel is the pixel to be subjected to the overlay processing, changes the pixel value of the target pixel of the image data of the color plate for a printing color to be changed in pixel value in the overlay processing, to a pixel value at the position decided by the decision unit.

BRIEF DESCRIPTION OF THE DRAWINGS

An exemplary embodiment of the present invention will be described in detail based on the following figures, wherein:

FIG. 19 is a sectional view for explaining the state of the trapping processing shown in FIG. 18.

DETAILED DESCRIPTION

Next, an exemplary embodiment of the present invention will be described in detail with reference to the accompanying drawings.

Figure 1:
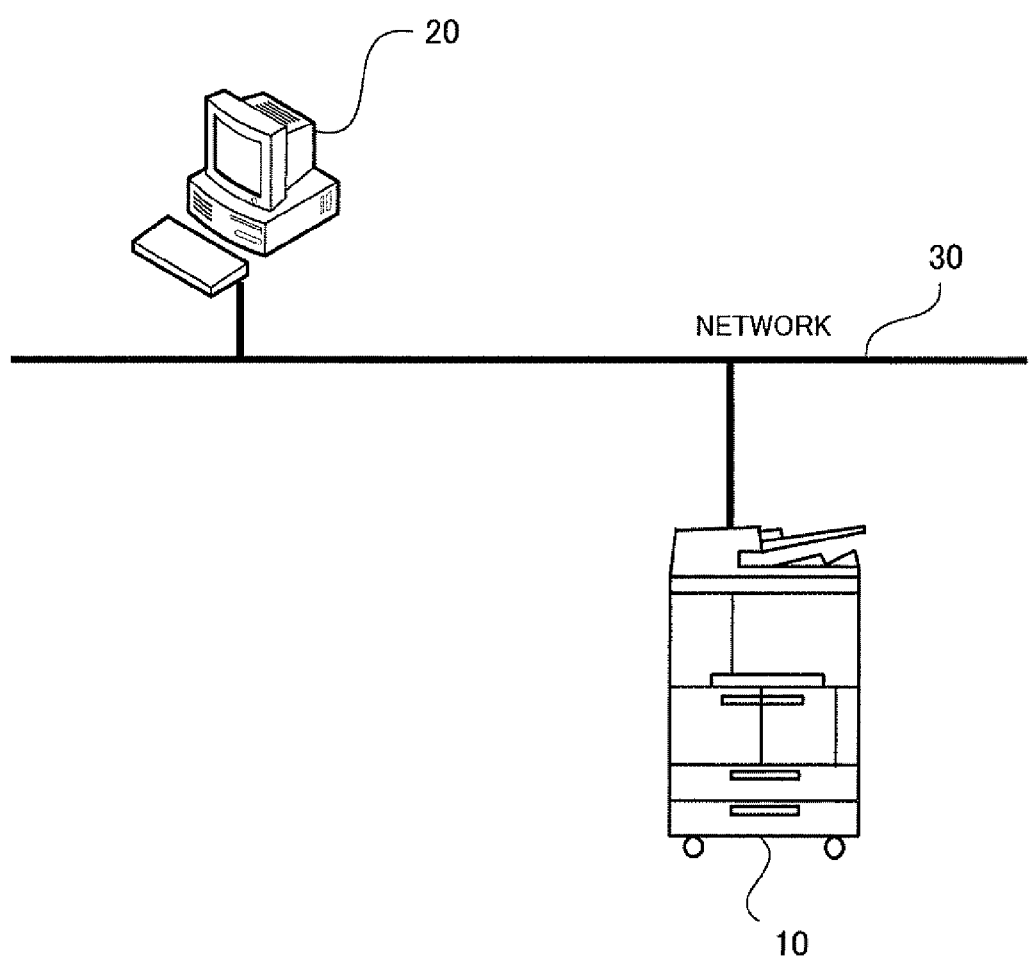
FIG. 1 shows a system configuration of an image forming apparatus 10 according to an exemplary embodiment of the present invention.

FIG. 1 is a block diagram showing a configuration of an image forming system according to the exemplary embodiment of the present invention.

As shown in FIG. 1, the image forming system according to the exemplary embodiment of the present invention is composed of an image forming apparatus 10 and a terminal device 20 which are interconnected via a network 30. The terminal device 20 generates print data and transmits the print data generated via the network 30 to the image forming apparatus 10. The image forming apparatus 10 receives the print data transmitted from the terminal device 20, and outputs an image corresponding to the print data on a print sheet.

Figure 2:
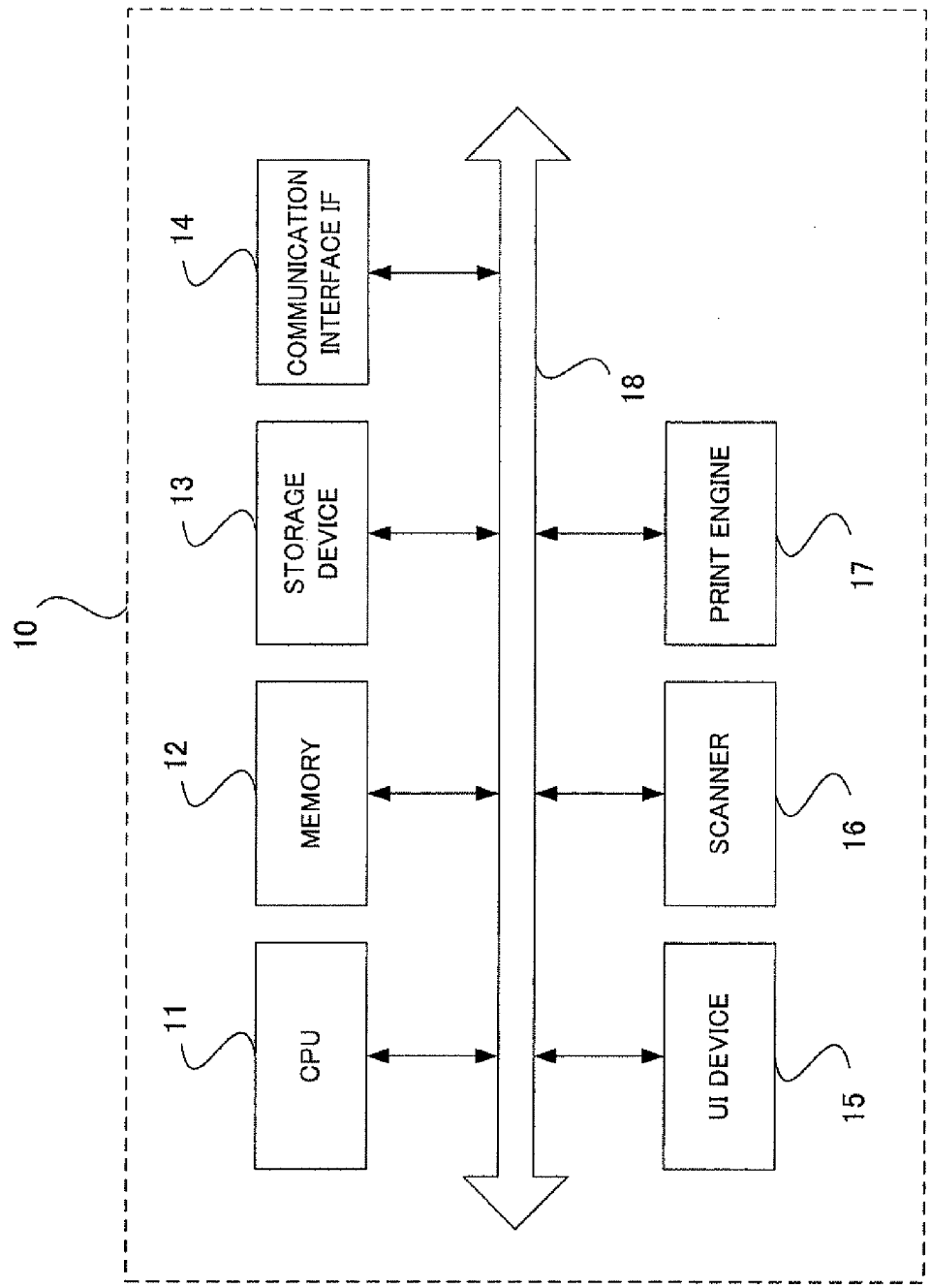
FIG. 2 is a block diagram showing a hardware configuration of the image forming apparatus 10 in the exemplary embodiment of the present invention.

Next, FIG. 2 shows a hardware configuration of the image forming apparatus 10 in the image forming system according to this exemplary embodiment.

As shown in FIG. 2, the image forming apparatus 10 includes a CPU 11, a memory 12, a storage device 13 such as a hard disk drive (HDD), a communication interface (IF) 14 for data transmission/reception between the image forming apparatus 10 and an external device or the like via the network 30, a user interface (UI) device 15 including a touch panel or a liquid crystal display and a keyboard, a scanner 16, and a print engine 17. These elements are interconnected via a control bus 18.

The CPU 11 executes predetermined processing on the basis of a control program stored in the memory 12 or the storage device 13 to control the operation of the image forming apparatus 10.

It should be noted that, in this exemplary embodiment, the CPU 11 reads and executes the control program stored in the memory 12 or the storage device 13. However, the arrangement may be such that the program is stored in a storage medium such as a CD-ROM and provided to the CPU 11.

Figure 3:
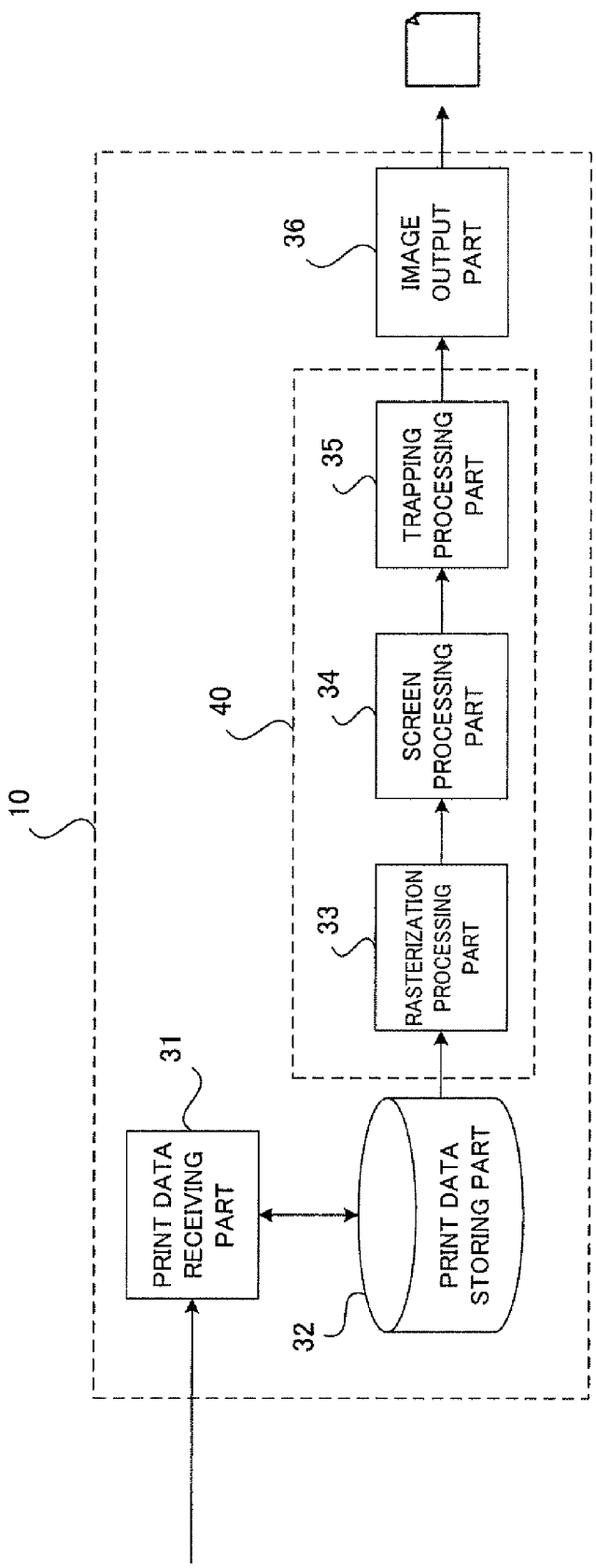
FIG. 3 is a block diagram showing a functional configuration of the image forming apparatus 10 in the exemplary embodiment of the present invention.

FIG. 3 is a block diagram showing a functional configuration of the image forming apparatus 10 realized by execution of the above-described control program.

As shown in FIG. 3, the image forming apparatus 10 according to this exemplary embodiment includes a print data receiving part 31, a print data storing part 32, an image processing apparatus 40, and an image output part 36.

The print data receiving part 31 receives the print data transmitted from the terminal device 20 to allow the print data to be stored in the print data storing part 32. The image processing apparatus 40 performs various kinds of image processing on the print data stored in the print data storing part 32, thereby generating image data for performing print processing to output the image data to the image output part 36.

The image processing apparatus 40 includes a rasterization processing part 33, a screen processing part 34, and a trapping processing part 35. It should be noted that, in this exemplary embodiment, the various kinds of processing, such as color conversion processing and tone correction processing in the image processing apparatus 40 will not be described in order to simplify the explanation.

The rasterization processing part 33 performs rasterization processing (development processing) on the print data stored in the print data storing part 32, thereby generating printable image data.

The screen processing part 34 performs screen processing (halftone-dot processing) on the image data subjected to the rasterization processing by the rasterization processing part 33. Note that the screen processing is processing for creating color tones on the basis of the number and density of halftone dots (screen ruling).

The trapping processing part 35 performs trapping processing (overlay processing) on the image data for each color plate of CMYK subjected to the screen processing by the screen processing part 34.

The trapping processing is processing for preventing the occurrence of a gap between images of different printing colors even when misregister among the respective color plates occurs. More specifically, the trapping processing is processing for providing a portion where the two images overlap on the boundary between adjacent images of different printing colors.

At the time of this trapping processing, the setting for extending a light-colored image toward a dark-colored image is generally made in order to prevent the overlapping portion from standing out. Therefore, it should be noted that, in this exemplary embodiment, descriptions will be made by using the case where the trapping processing is performed so as to extend CMY color images toward a K color image. However, also in the case where the trapping processing is performed with a combination of other colors, the present invention may be realized, in the same manner as this exemplary embodiment.

The image output part 36 outputs, on a print sheet, an image based on the image data subjected to the trapping processing by the trapping processing part 35.

Figure 4:
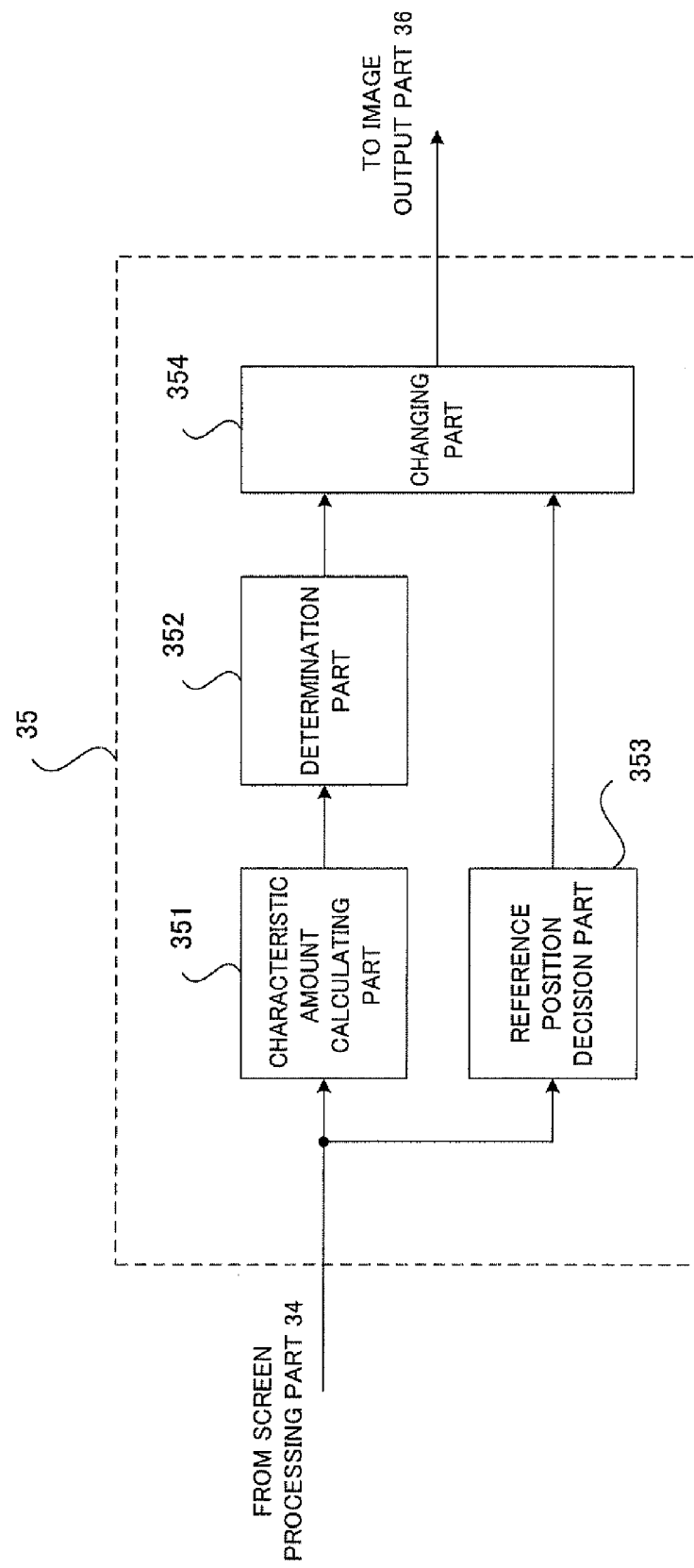
FIG. 4 is a block diagram showing a configuration of a trapping processing part 35 of FIG. 3.

Also, as shown in FIG. 4, the trapping processing part 35 is composed of a characteristic amount calculating part 351, a determination part 352, a reference position decision part 353, and a changing part 354.

The characteristic amount calculating part 351 sequentially selects pixels as a target pixel, on binary image data composed of plural color plates for each printing color after having been subjected to the screen processing, and calculates a characteristic amount in each of plural preset areas around the selected target pixel on the basis of states of pixels in the areas.

More specifically, the characteristic amount calculating part 351 calculates the characteristic amount, on the basis of the number of change points at which pixels in each of the preset areas of the image data of the color plate (K plate) for a printing color having no change in pixel value in the trapping processing change between ON (1) and OFF (0), and on the basis of whether or not all pixels in each of the preset areas are either ON or OFF.

Figure 5:
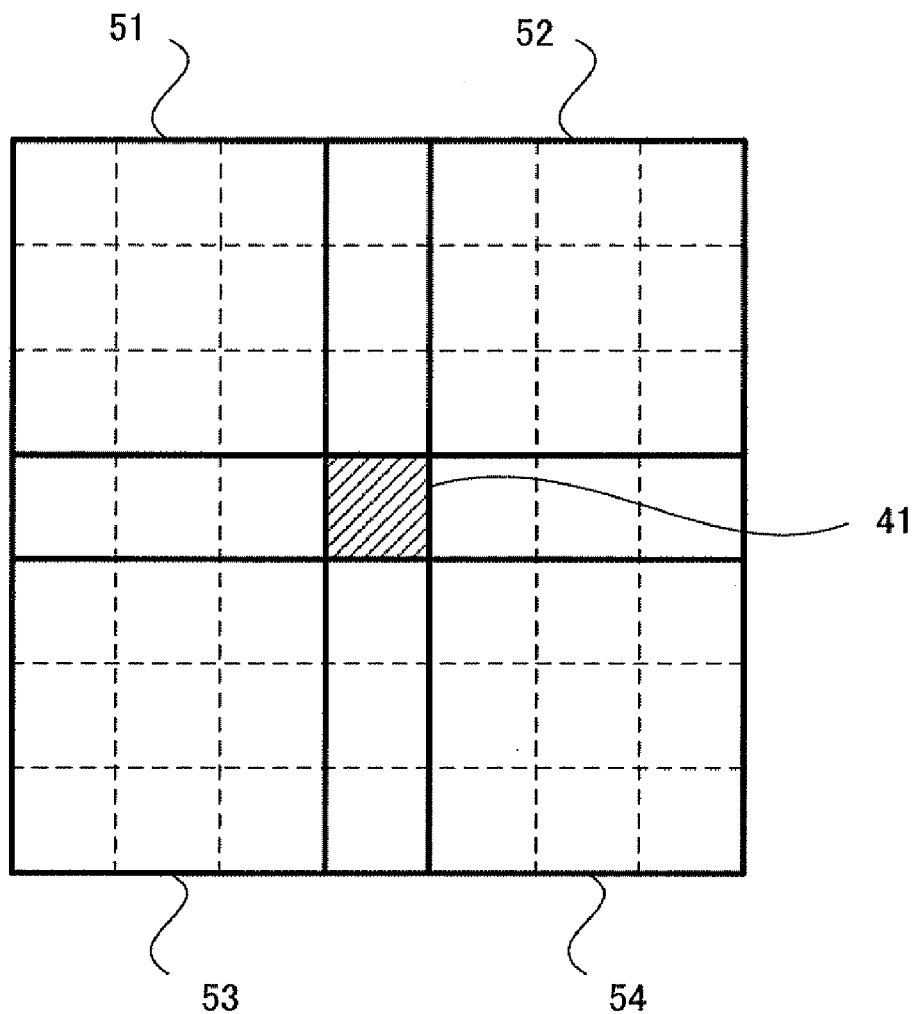
FIG. 5 shows four preset areas 51 to 54 provided around a target pixel 41 according to the exemplary embodiment of the present invention.
Figure 6A:
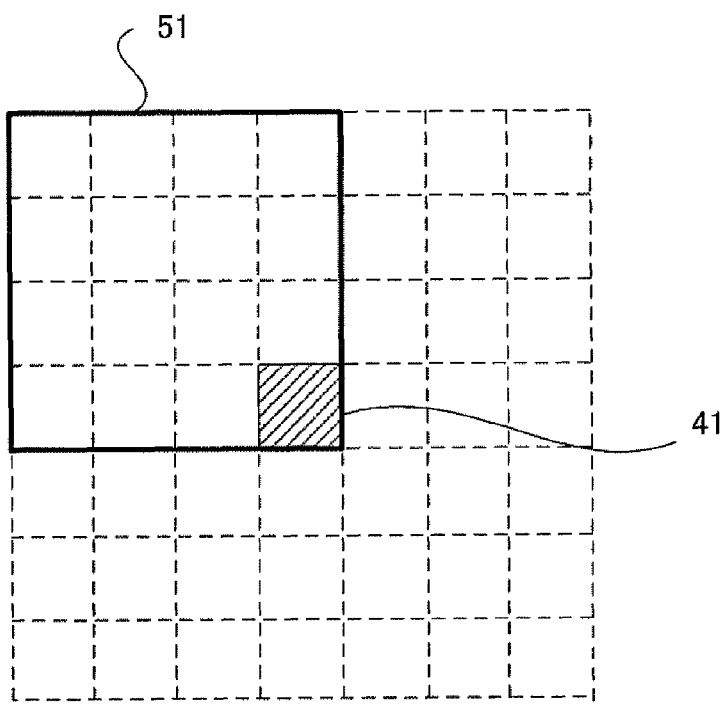
FIGS. 6A and 6B show the preset area 51 alone and the preset area 52 alone, respectively.
Figure 6B:
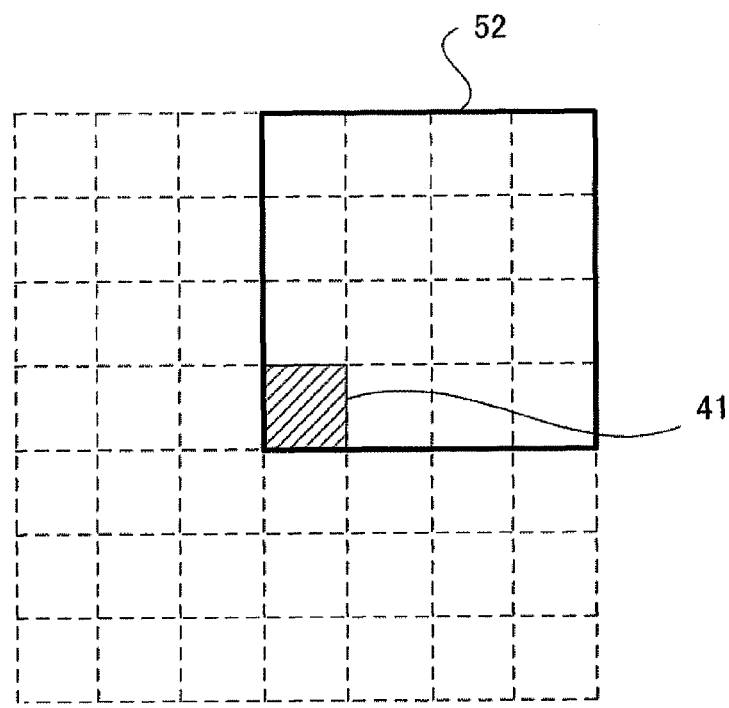
Figure 7A:
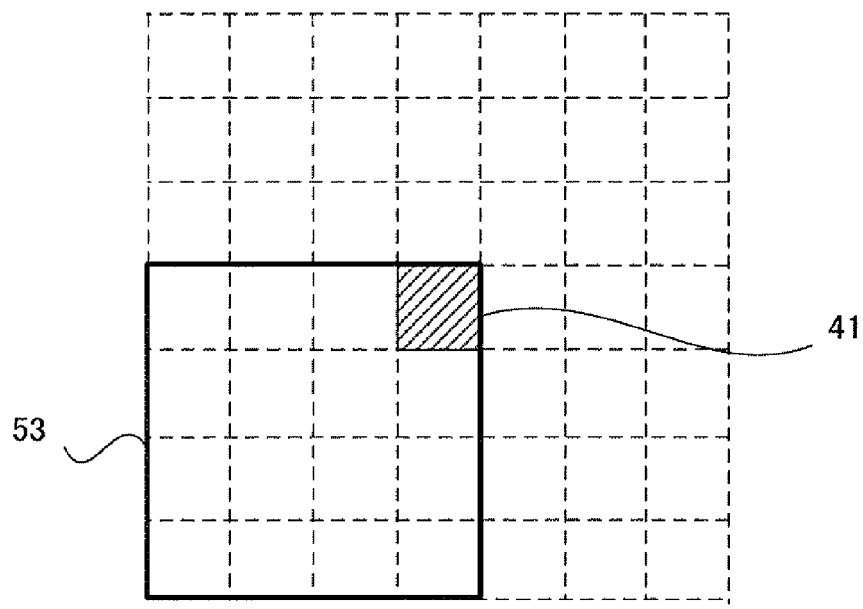
FIGS. 7A and 7B show the preset area 53 alone and the preset area 54 alone, respectively.
Figure 7B:
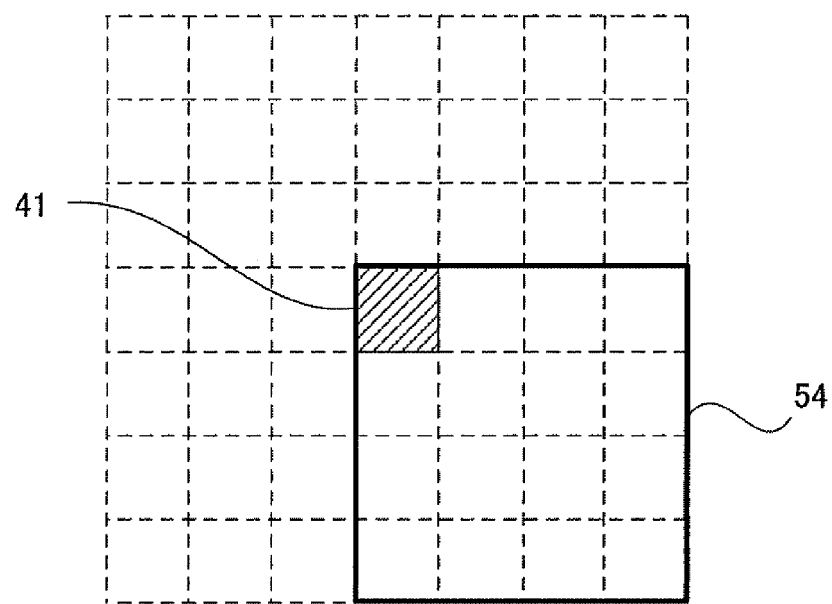
Figure 8D:
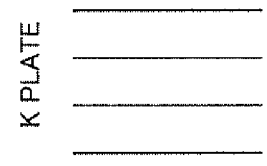
FIGS. 8A to 8D show a screen attribute for color plates of M, C, Y, and K, respectively, according to the exemplary embodiment of the present invention.
Figure 8C:
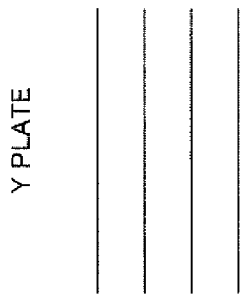
Figure 8B:
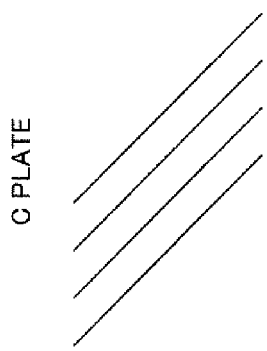
Figure 8A:
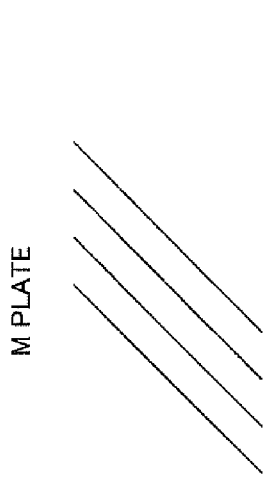

Concrete examples of these preset areas will be described with reference to FIGS. 5 to 7B. As shown in FIG. 5, for example, four preset areas 51 to 54 are set around a target pixel 41. Each of the preset areas 51 to 54 is composed of 4×4 pixels including the target pixel 41. Since FIG. 5 in which the four preset areas 51 to 54 overlap is less visible, for easy visibility, these preset areas 51 to 54 are separately shown in FIGS. 6A, 6B, 7A, and 7B, respectively.

The determination part 352 determines, on the basis of the characteristic amount in each of the preset areas calculated by the characteristic amount calculating part 351, whether or not the target pixel is a pixel to be subjected to trapping processing.

More specifically, if it is determined that the pixel value of the target pixel of the image data of the color plate (K plate) for the printing color having no change in pixel value in the trapping processing is ON and also it is determined, on the basis of the characteristic amount calculated by the characteristic amount calculating part 351, that a boundary portion of the image is included in any of the preset areas, the determination part 352 determines that the target pixel is the pixel to be subjected to the overlay processing. Further details of the determination processing will be described later.

The reference position decision part 353 decides, for each color plate of CMYK, a reference position of a pixel to be referred to when changing the pixel value of the target pixel, on the basis of a screen attribute (halftone-dot processing attribute) for each of the color plates.

In this exemplary embodiment, the reference position decision part 353 decides, for each color plate of CMYK, a reference position of a pixel to be referred to when changing the pixel value of the target pixel, on the basis of a screen angle and a screen ruling in the screen processing.

Descriptions will be made on the assumption that the screen attribute for each color plate of an M (magenta) plate, a C (cyan) plate, a Y (yellow) plate, and a K (black) plate is as shown in FIGS. 8A to 8D, respectively.

Referring to FIGS. 8A to 8D, it can be seen that the screen angles of the M plate, the C plate, the Y plate, and the K plate are 45°, 135°, 180°, and 90°, respectively. Here, the screen ruling is set as a fixed value.

When these screen attributes are set, the reference position decision part 353 sets reference positions for each color plate as shown in FIGS. 9A to 10B.

Figure 9A:
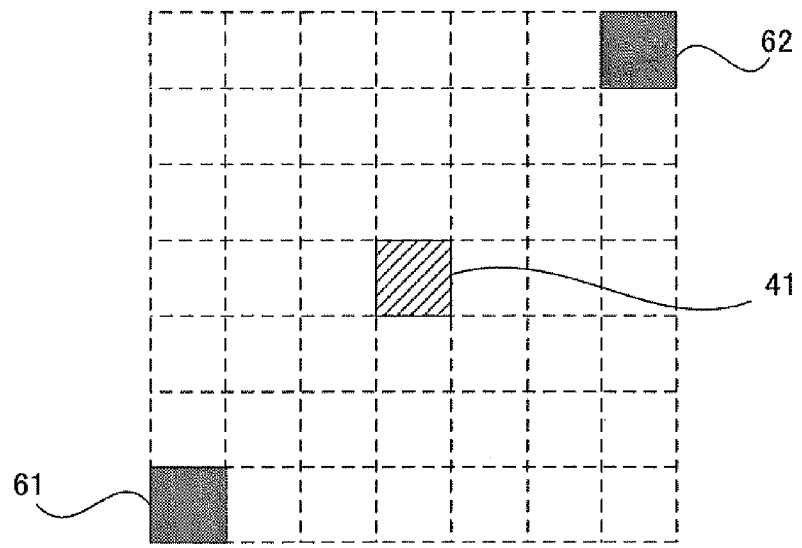
FIGS. 9A and 9B show examples of reference positions on the M plate and the C plate, respectively.

For example, since the screen angle of the M plate is 45°, the reference position decision part 353 sets, as reference positions 61 and 62, pixels located in a 45-degree direction (and a 225-degree direction) with respect to the target pixel 41, as shown in FIG. 9A.

Figure 9B:
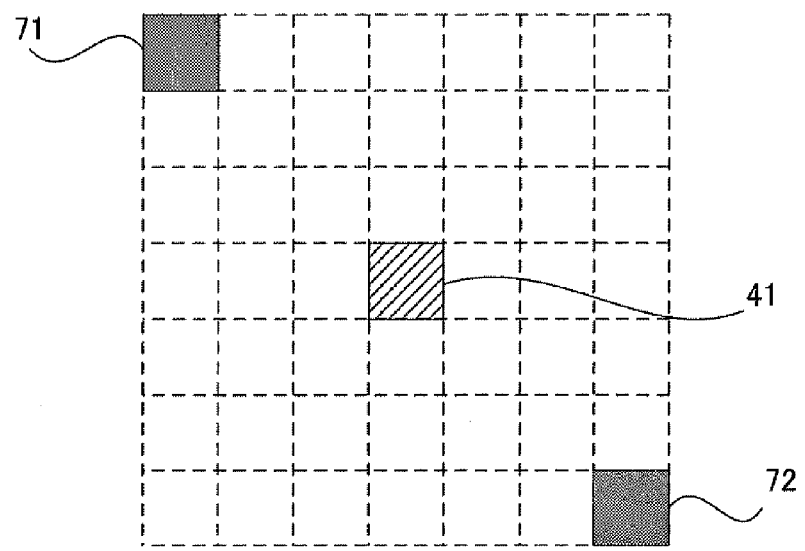

In the same manner, since the screen angle of the C plate is 135°, the reference position decision part 353 sets, as reference positions 71 and 72, pixels located in a 135-degree direction (and a 315-degree direction) with respect to the target pixel 41, as shown in FIG. 9B.

Figure 10A:
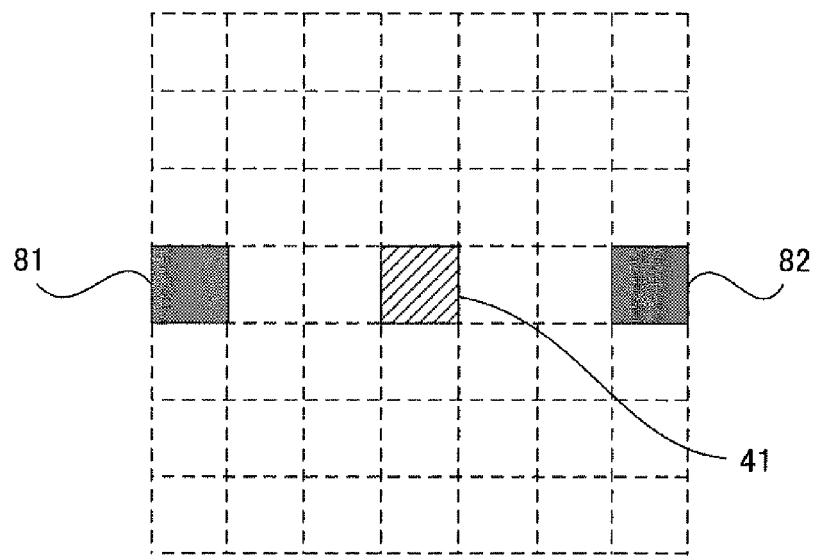
FIGS. 10A and 10B show examples of reference positions on the Y plate and the K plate, respectively.

In the same manner, since the screen angle of the Y plate is 180°, the reference position decision part 353 sets, as reference positions 81 and 82, pixels located in a 180-degree direction (and a 0-degree direction) with respect to the target pixel 41, as shown in FIG. 10A.

Figure 10B:
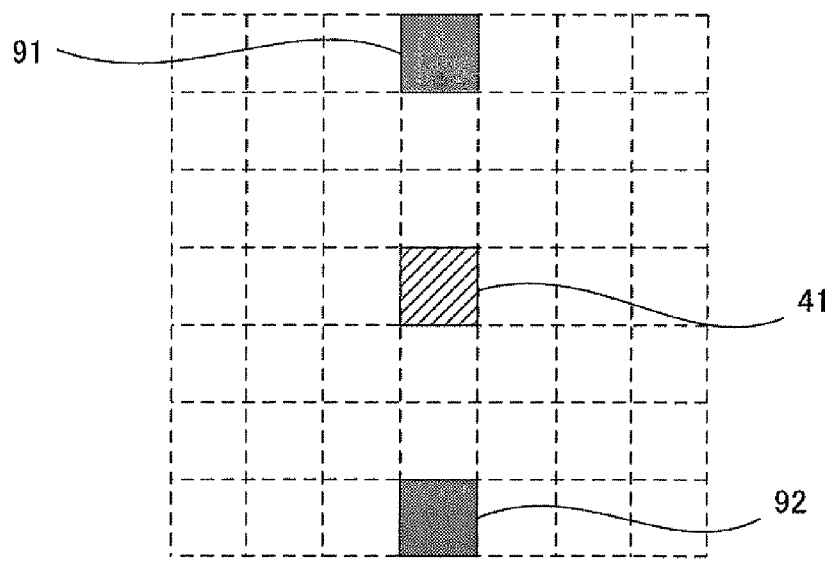

In the same manner, since the screen angle of the K plate is 90°, the reference position decision part 353 sets, as reference positions 91 and 92, pixels located in a 90-degree direction (and a 270-degree direction) with respect to the target pixel 41, as shown in FIG. 10B.

If it is determined by the determination part 352 that the target pixel is the pixel to be subjected to the trapping processing, the changing part 354 changes the pixel value of the target pixel of the image data for each of the color plates (CMY plates) of printing colors to be changed in pixel value in the trapping processing, to a pixel value at any one of the two reference positions determined for each color plate by the reference position decision part 353.

It should be noted that, rather than calculating reference positions by the reference position decision part 353, a reference position based on a screen processing attribute for each color plate may be preset for each color plate of CMYK. In this case, if it is determined by the determination part 352 that the target pixel is the pixel to be subjected to the trapping processing, the changing part 354 changes the value of the target pixel of the image data for the color plate of a printing color to be changed in pixel value in the trapping processing, to a pixel value at a preset reference position based on a halftone-dot processing attribute for each color plate.

The image data changed in pixel value by the changing part 354 is transmitted to the image output part 36. The image output part 36 outputs an image on the basis of the image data subjected to the target pixel value change processing by the changing part 354.

Next, the operation of the image forming apparatus 10 according to this exemplary embodiment will be described in detail with reference to the drawings.

Figure 11:
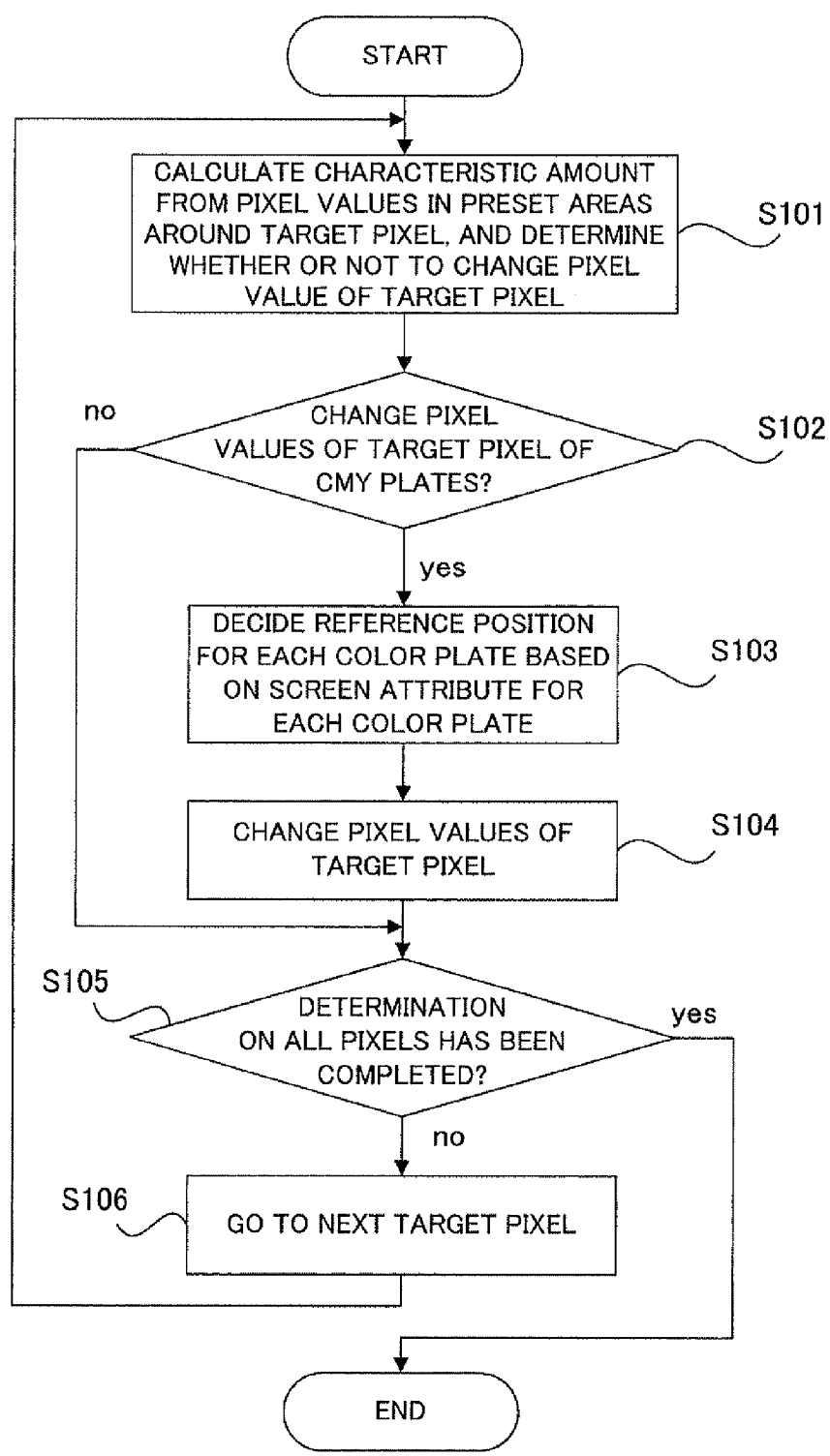
FIG. 11 is a flowchart showing operation of the trapping processing part 35 in the image forming apparatus 10 according to the exemplary embodiment of the present invention.

Note that the following description will be made only in terms of the operation of the trapping processing part 35 for performing the trapping processing on the binary image data for each color plate of CMYK subjected to the screen processing. FIG. 11 is a flowchart showing the operation of the trapping processing part 35 in the image forming apparatus 10 according to this exemplary embodiment.

Figure 12:
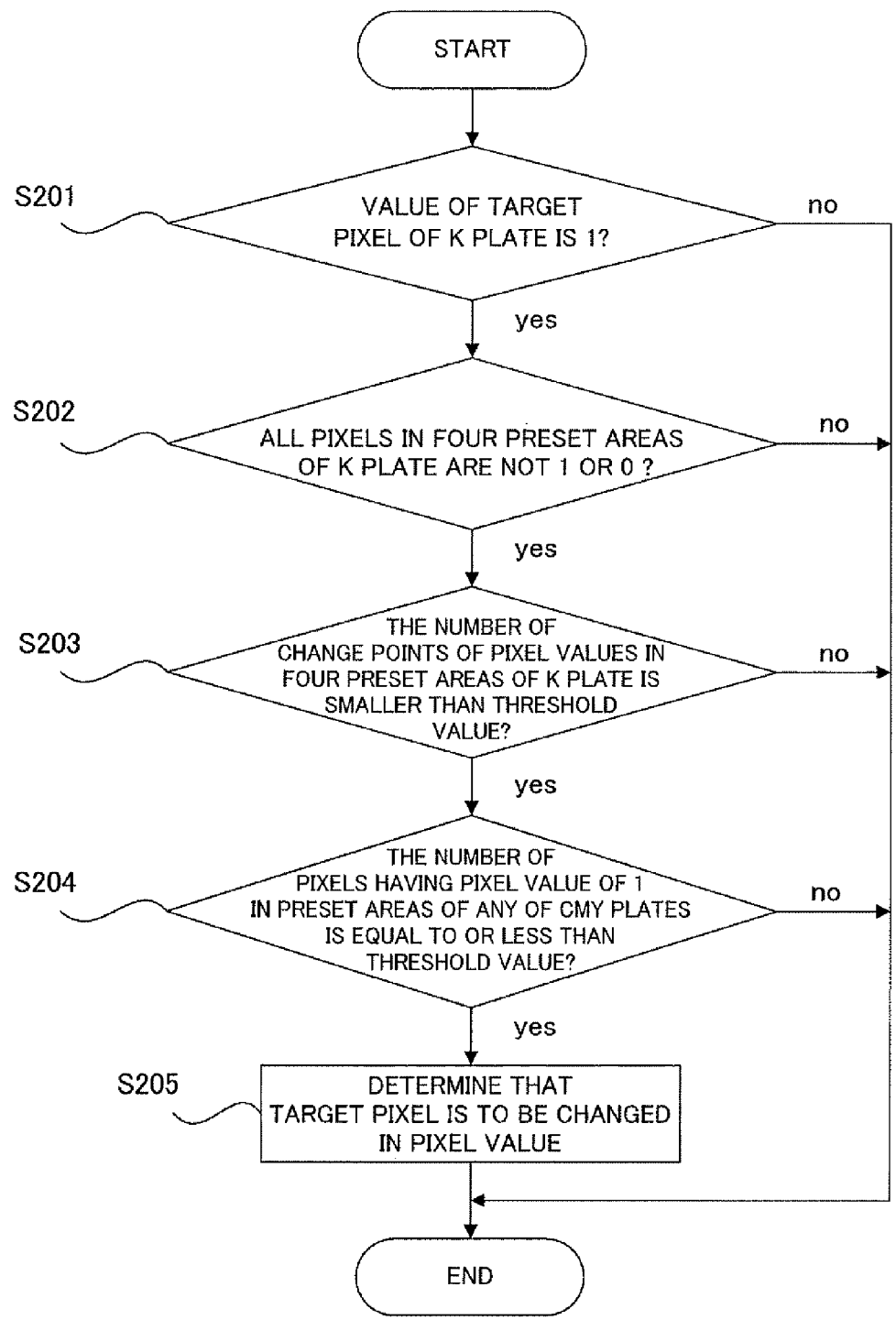
FIG. 12 is a flowchart for explaining in detail processing of step S101 in the flowchart of FIG. 11.

First, in the trapping processing part 35, the characteristic amount calculating part 351 calculates a characteristic amount from pixel values in the preset areas around the target pixel, and the determination part 352 determines, on the basis of the calculated characteristic amount, whether or not to change the pixel value of the target pixel (step S101). The details of the processing in step S101 will be described with reference to the flowchart of FIG. 12.

If all conditions in steps S201 to S204 are satisfied, the determination part 352 determines that the target pixel is the pixel to be changed in pixel value (step S205). On the other hand, if any conditions in steps S201 to S204 are not satisfied, the processing ends.

More specifically, first, the determination part 352 determines whether or not the value of the target pixel of the K plate is 1 (ON) (step S201). If the target pixel of the K plate is not 1 (NO in step S201), the processing ends.

If the value of the target pixel of the K plate is 1 (YES in step S201), the determination part 352 determines whether or not the all pixels in the four preset areas 51 to 54 of the K plate are not 1 or 0 (step S202). Also, the determination part 352 determines whether or not the number of change points at which the pixel values in the four preset areas 51 to 54 of the K plate change between 1 and 0 is smaller than a threshold value (step S203).

In the processing in steps S202 and S203, it is determined whether or not the four preset areas 51 to 54 of the K plate include an area that is solid black or solid white, or whether or not all pixels in the four preset areas 51 to 54 have the same grayscale.

In step S203, the number of change points at which the pixel values change between 1 and 0 is compared with the threshold value. This is because the number of change points between 1 and 0 larger than the threshold value means that all pixels in the preset areas have been subjected to half-toning through the screen processing.

Furthermore, the determination part 352 determines whether or not the number of pixels having a pixel value of 1 in the preset areas of any of the color plates, CMY plates, other than the K plate, is equal to or less than the threshold value (step S204).

If all conditions shown in steps S201 to S204 described above are satisfied, the determination part 352 determines that the boundary portion between a K-plate image and CMY-plate images is included in any of the four preset areas 51 to 54, and determines that the target pixel is the pixel to be changed in pixel value.

Figure 13:
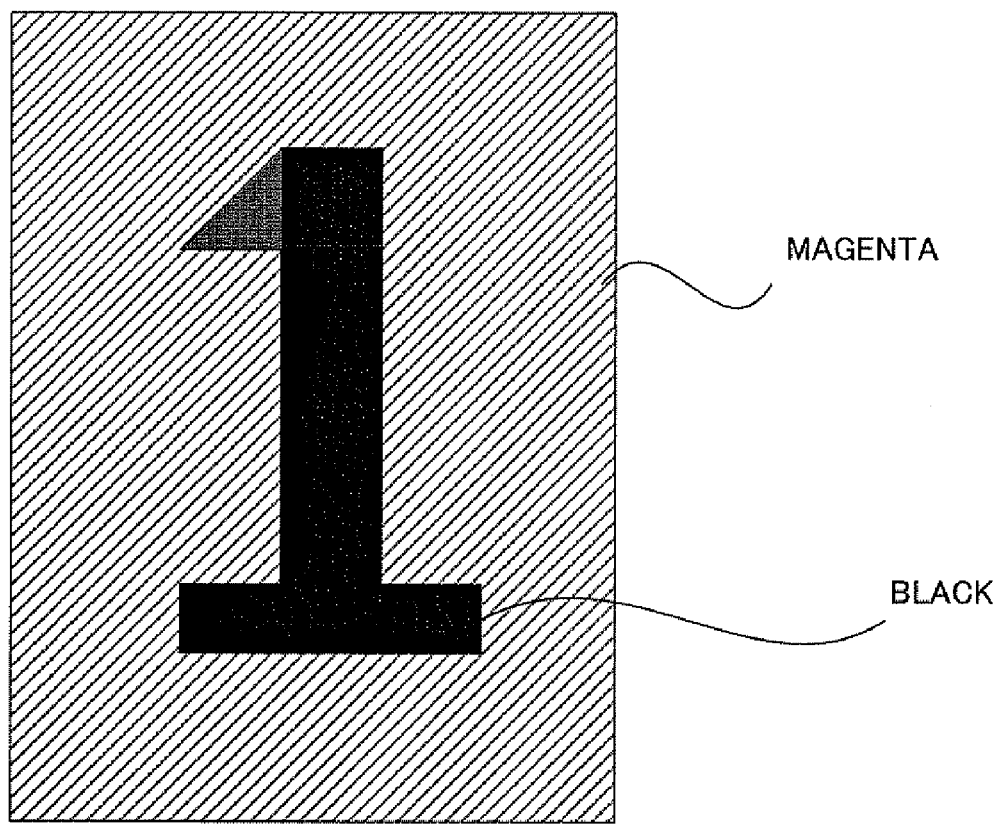
FIG. 13 shows an image to be subjected to trapping processing according to the exemplary embodiment of the present invention.
Figure 14:
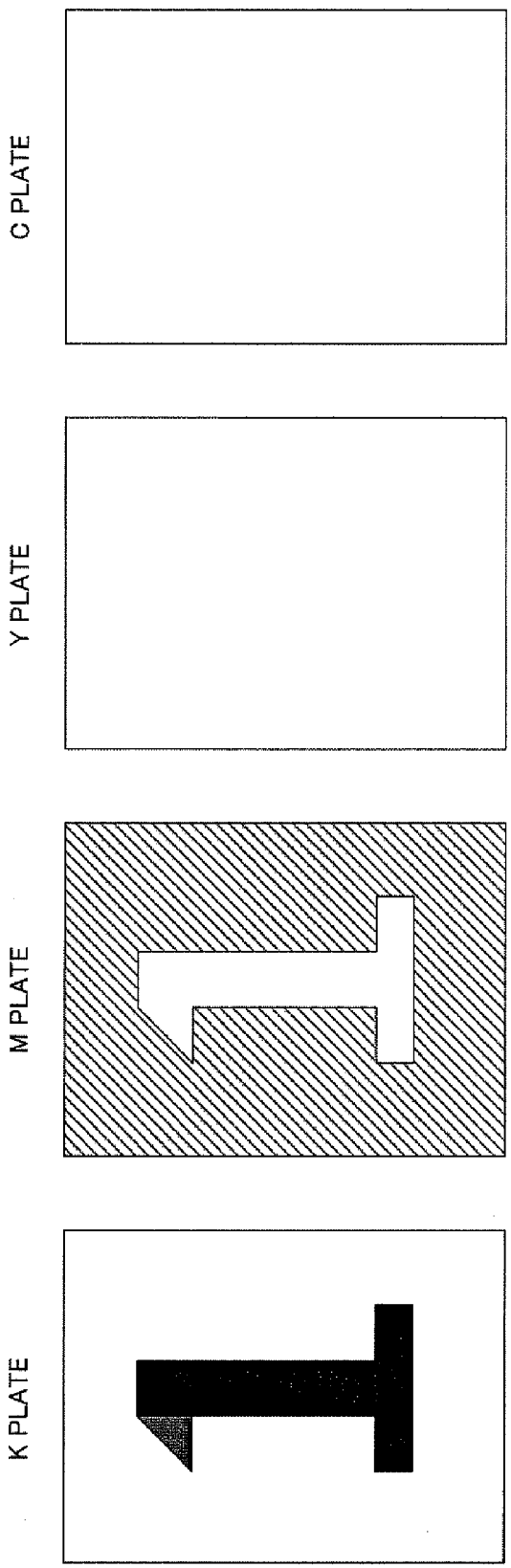
FIG. 14 illustrates a state of each color plate of the image shown in FIG. 13.

For example, in terms of the case where the trapping processing is performed on an image shown in FIG. 13, a description will be made. For ease of explanation, assuming that the image shown in FIG. 13 is composed only of black and magenta, the respective CMYK color plates are configured as shown in FIG. 14. That is, the pixels of the K and M plates include 1, and all pixels of the Y and C plates are 0.

Figure 15:
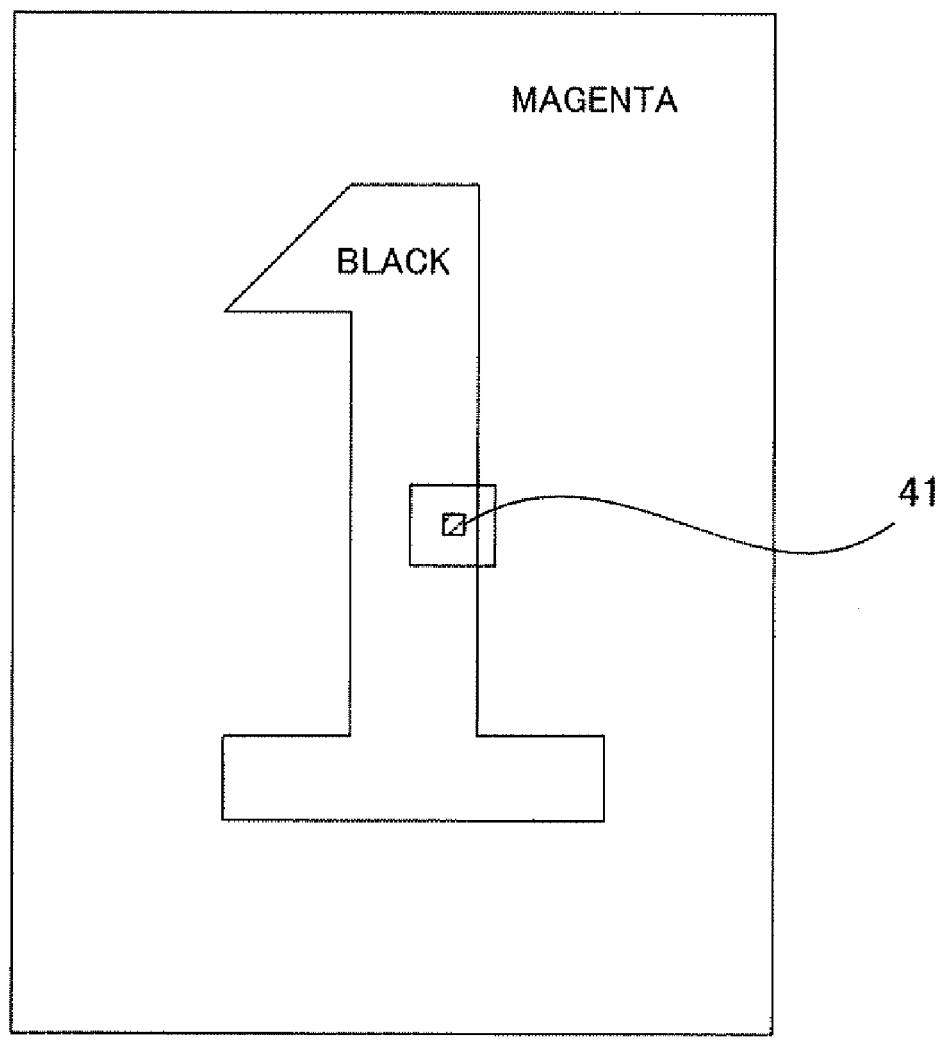
FIG. 15 shows the position of the target pixel 41 on the image shown in FIG. 13.
Figure 16:
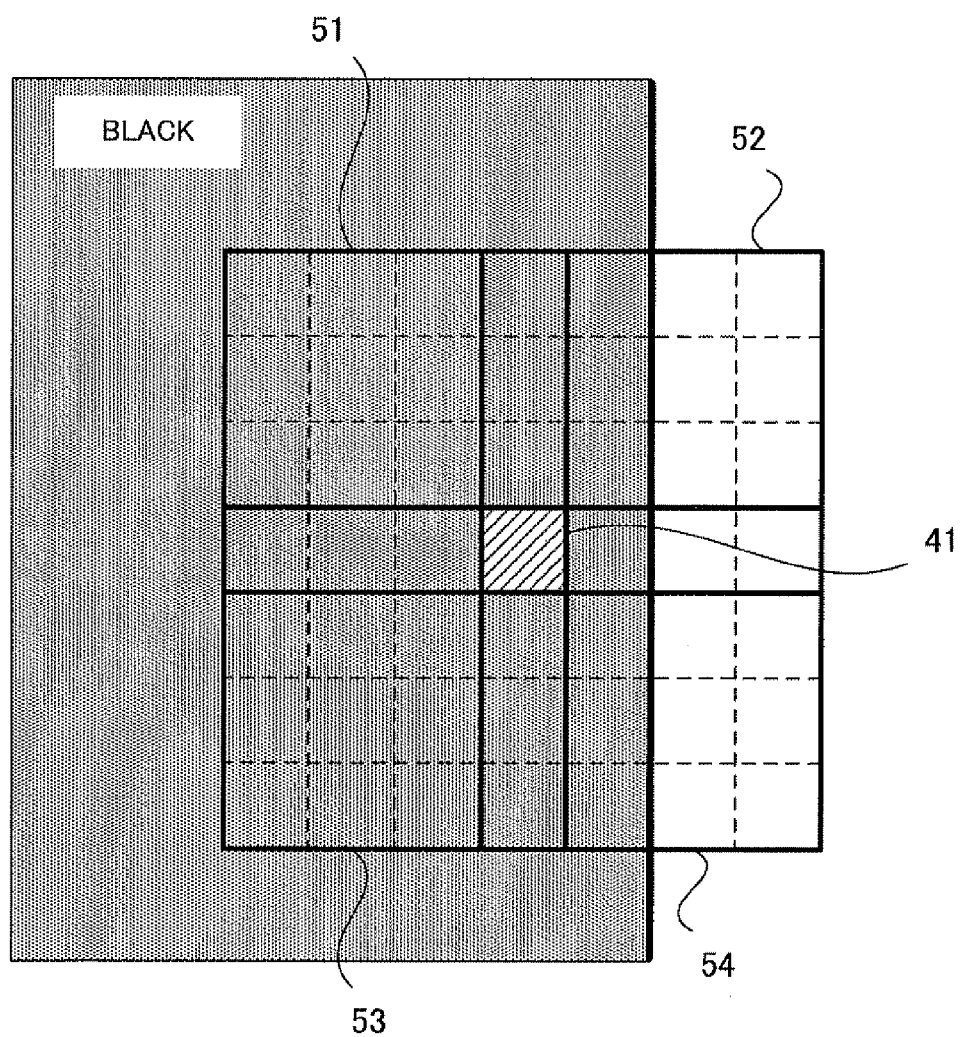
FIG. 16 illustrates a state of each pixel in the preset areas 51 to 54 on the K plate with the target pixel 41 in the position shown in FIG. 15.
Figure 17:
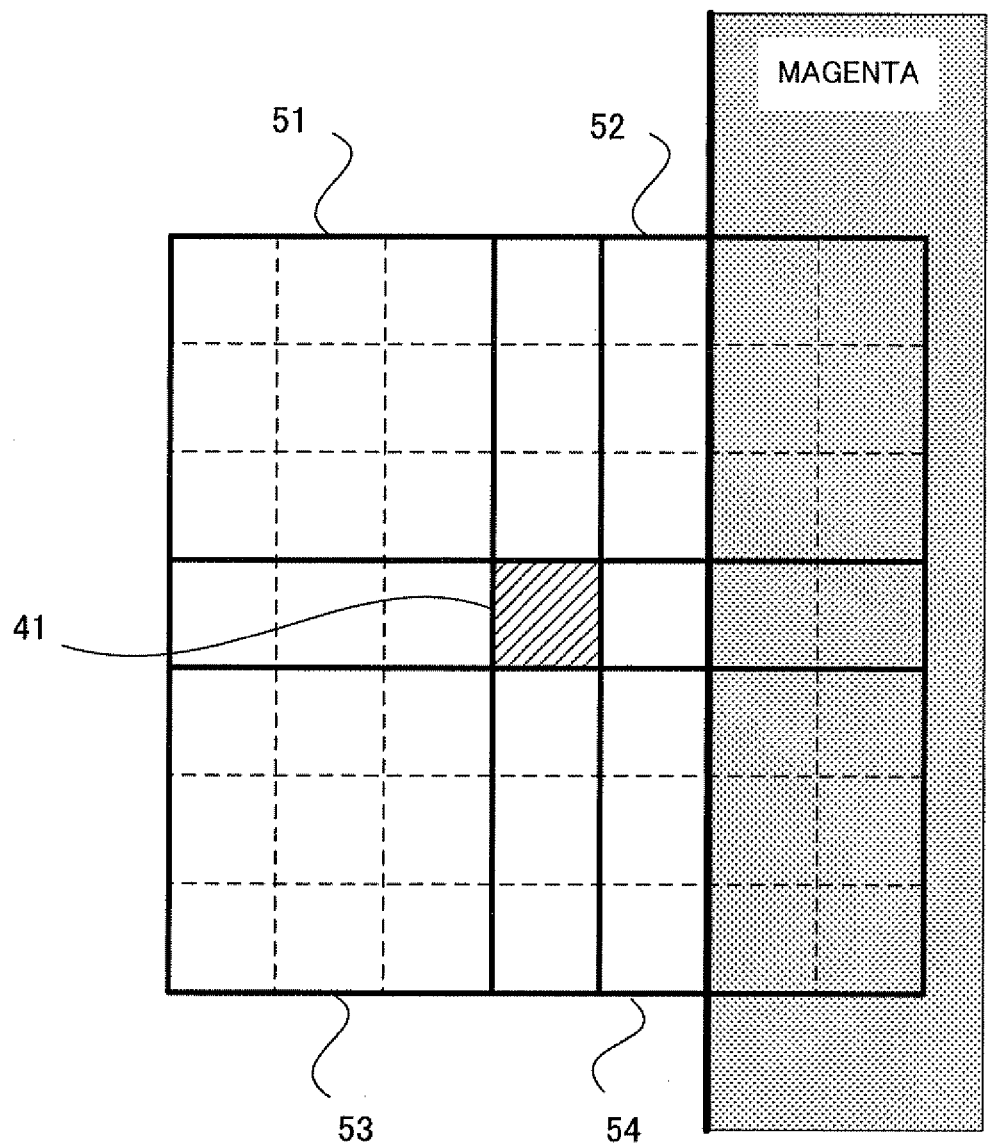
FIG. 17 illustrates a state of each pixel in the preset areas 51 to 54 on the M plate with the target pixel 41 in the position shown in FIG. 15.

In this image, when the target pixel 41 is at the position shown in FIG. 15, the state of each pixel in the preset areas 51 to 54 of the K plate is as shown in FIG. 16, and the state of each pixel in the preset areas 51 to 54 of the M plate is as shown in FIG. 17.

That is to say, on the K plate, all pixels in the preset areas 51 and 53 are 1, while the pixels in each of the preset areas 52 and 54 include both 1 and 0, as shown in FIG. 16. On the M plate, as shown in FIG. 17, the number of pixels having a pixel value of 1 in the preset areas 51 and 53 is equal to or less than the threshold value.

Therefore, when the target pixel 41 exists at the position shown in FIG. 15, it is determined that the pixel value of the target pixel 41 is to be changed.

Referring back to FIG. 11, when, as a result of the determination on the target pixel made as described above, it is determined that the pixel values of the target pixel for the CMY plates are not to be changed, if determination on all pixels is unfinished (step S105), the process goes to the next target pixel (step S106), and the process from step S101 continues.

On the other hand, if it is determined in step S101 that the pixel values of the target pixel for the CMY plates are to be changed (YES in step S102), the reference position decision part 353 decides a reference position for each color plate on the basis of the screen attribute for each color plate (step S103), and changes the value of the target pixel for each CMY plate on the basis of the reference position for each color plate (step S104).

Then it is determined whether or not determination on all pixels has been completed (step S105). Until the determination on all pixels is completed, the process goes to the next target pixel (step S106), and the process from step S101 continues.

Figure 18:
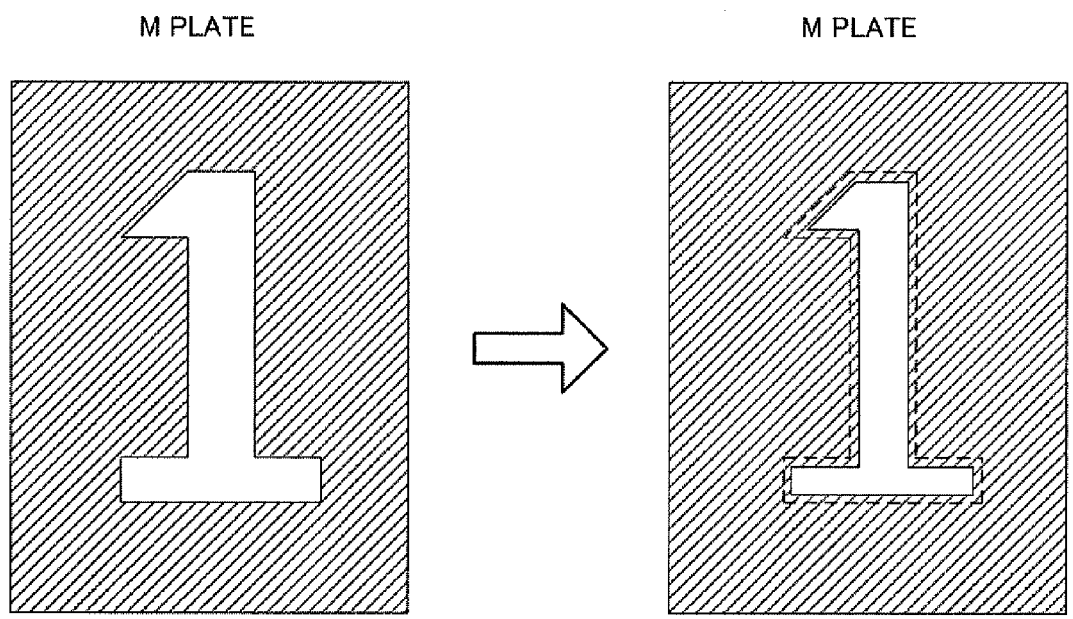
FIG. 18 illustrates a state in which the trapping processing is performed on M-plate image data of the image example shown in FIG. 13.

FIGS. 18 and 19 illustrate the state in which the trapping processing is performed on the image data of the M plate of the image example shown in FIGS. 13 and 14 in this manner. Referring to FIG. 18, it can be seen that the image of the M plate is modified to extend toward the K (black) color image. FIG. 19 is a sectional view showing the state of such trapping processing. Referring to FIG. 19, it can be seen that the M-plate image is extended so as to overlap the K-plate image.

It should be noted that, in this exemplary embodiment, descriptions have been made in terms of the case of performing the trapping processing on the binary image data that has been subjected to the screen processing. However, the present invention not only can be applied to binary image data with 1 bit per pixel, but also can be applied in the same manner to binary and multivalued image data.

For example, the present invention may be applied in the same manner even to formally multivalued image data with each pixel represented by 8 bits when it is actual binary image data having only two pixel values, either 0 or 255.

In addition, it should be noted that, in this exemplary embodiment, the screen ruling and the screen angle are used for deciding the position of a pixel to be referred to when changing the pixel value of the target pixel. Alternatively, a screen shape or dither matrix contents (a value of each matrix element, that is, the growth order of dots and lines) may be used, thereby allowing more precise decision of the position of the pixel to be referred to.

Note that these screen attributes may be set as fixed values in the overlay processing.

The foregoing description of the exemplary embodiment of the invention has been provided for the purposes of illustration and description. It is not intended to be exhaustive or to limit the invention to the precise forms disclosed. Obviously, many modifications and variations will be apparent to practitioners skilled in the art. The exemplary embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image processing apparatus comprising:
a calculating unit that sequentially selects pixels as a target pixel, on binary image data composed of a plurality of color plates for each printing color after having been subjected to halftone-dot processing, and calculates a characteristic amount in each of a plurality of preset areas around the selected target pixel on the basis of states of pixels in the areas;
a determination unit that determines, on the basis of the characteristic amount in each of the areas calculated by the calculating unit, whether or not the target pixel is a pixel to be subjected to overlay processing;
a decision unit that decides, for each of the color plates, a position of a pixel to be referred to when changing a pixel value of the target pixel, on the basis of a halftone-dot processing attribute for each of the color plates; and
a changing unit that, if it is determined by the determination unit that the target pixel is the pixel to be subjected to the overlay processing, changes the pixel value of the target pixel of the image data of the color plate for a printing color to be changed in pixel value in the overlay processing, to a pixel value at the position decided by the decision unit.

2. The image processing apparatus according to claim 1, wherein the decision unit decides, for each of the color plates, a position of a pixel to be referred to when changing the pixel value of the target pixel, on the basis of a screen angle and a screen ruling in the halftone-dot processing.

3. An image processing apparatus comprising:
a calculating unit that sequentially selects pixels as a target pixel, on binary image data composed of a plurality of color plates for each printing color after having been subjected to halftone-dot processing, and calculates a characteristic amount in each of a plurality of preset areas around the selected target pixel on the basis of states of pixels in the areas;
a determination unit that determines, on the basis of the characteristic amount in each of the areas calculated by the calculating unit, whether or not the target pixel is a pixel to be subjected to overlay processing; and
a changing unit that, if it is determined by the determination unit that the target pixel is the pixel to be subjected to the overlay processing, changes a pixel value of the target pixel of the image data of the color plate for a printing color to be changed in pixel value in the overlay processing, to a pixel value at a preset position based on a halftone-dot processing attribute for each of the color plates.

4. The image processing apparatus according to claim 1, wherein the calculating unit calculates the characteristic amount, on the basis of the number of change points at which pixels in each of the areas of the image data of the color plate for a printing color having no change in pixel value in the overlay processing change between ON and OFF, and on the basis of whether or not all pixels in each of the areas are either ON or OFF; and
if it is determined that the pixel value of the target pixel of the image data of the color plate for the printing color having no change in pixel value in the overlay processing is ON and also it is determined, on the basis of the characteristic amount calculated by the calculating unit, that a boundary portion of an image is included in any of the areas, the determination unit determines that the target pixel is the pixel to be subjected to the overlay processing.

5. An image forming apparatus comprising:
a calculating unit that sequentially selects pixels as a target pixel, on binary image data composed of a plurality of color plates for each printing color after having been subjected to halftone-dot processing, and calculates a characteristic amount in each of a plurality of preset areas around the selected target pixel on the basis of states of pixels in the areas;
a determination unit that determines, on the basis of the characteristic amount in each of the areas calculated by the calculating unit, whether or not the target pixel is a pixel to be subjected to overlay processing;
a decision unit that decides, for each of the color plates, a position of a pixel to be referred to when changing a pixel value of the target pixel, on the basis of a halftone-dot processing attribute for each of the color plates;
a changing unit that, if it is determined by the determination unit that the target pixel is the pixel to be subjected to the overlay processing, changes the pixel value of the target pixel of the image data of the color plate for a printing color to be changed in pixel value in the overlay processing, to a pixel value at the position decided by the decision unit; and
an image output unit that outputs an image on the basis of the image data subjected to the target pixel value change processing by the changing unit.

6. An image forming apparatus comprising:
a calculating unit that sequentially selects pixels as a target pixel, on binary image data composed of a plurality of color plates for each printing color after having been subjected to halftone-dot processing, and calculates a characteristic amount in each of a plurality of preset areas around the selected target pixel on the basis of states of pixels in the areas;

a determination unit that determines, on the basis of the characteristic amount in each of the areas calculated by the calculating unit, whether or not the target pixel is a pixel to be subjected to overlay processing;

a changing unit that, if it is determined by the determination unit that the target pixel is the pixel to be subjected to the overlay processing, changes a pixel value of the target pixel of the image data of the color plate for a printing color to be changed in pixel value in the overlay processing, to a pixel value at a preset position based on a halftone-dot processing attribute for each of the color plates; and an image output unit that outputs an image on the basis of the image data subjected to the target pixel value change processing by the changing unit.

7. A non transitory computer readable medium storing a program causing a computer to execute a process comprising:

sequentially selecting pixels as a target pixel, on binary image data composed of a plurality of color plates for each printing color after having been subjected to halftone-dot processing, and calculating a characteristic amount in each of a plurality of preset areas around the selected target pixel on the basis of states of pixels in the areas;

determining, on the basis of the calculated characteristic amount in each of the areas, whether or not the target pixel is a pixel to be subjected to overlay processing;

deciding, for each of the color plates, a position of a pixel to be referred to when changing a pixel value of the target pixel, on the basis of a halftone-dot processing attribute for each of the color plates; and if it is determined that the target pixel is the pixel to be subjected to the overlay processing, changing the pixel value of the target pixel of the image data of the color plate for a printing color to be changed in pixel value in the overlay processing, to a pixel value at the position decided to be referred to when changing the pixel value of the target pixel.

8. A non transitory computer readable medium storing a program causing a computer to execute a process comprising:

sequentially selecting pixels as a target pixel, on binary image data composed of a plurality of color plates for each printing color after having been subjected to halftone-dot processing, and calculating a characteristic amount in each of a plurality of preset areas around the selected target pixel on the basis of states of pixels in the areas;

determining, on the basis of the calculated characteristic amount in each of the areas, whether or not the target pixel is a pixel to be subjected to overlay processing; and if it is determined that the target pixel is the pixel to be subjected to the overlay processing, changing a pixel value of the target pixel of the image data of the color plate for a printing color to be changed in pixel value in the overlay processing, to a pixel value at a preset position based on a halftone-dot processing attribute for each of the color plates.

\* \* \* \* \*

UNITED STATES PATENT AND TRADEMARK OFFICE
CERTIFICATE OF CORRECTION

PATENT NO. : 8,400,684 B2
APPLICATION NO. : 12/855287
DATED : March 19, 2013
INVENTOR(S) : Hiroyuki Kawano Page 1 of 1

It is certified that error appears in the above-identified patent and that said Letters Patent is hereby corrected as shown below:

In the Claims:
Column 9, Line 21, Claim 7, delete "non transitory" and insert --non-transitory--; and
Column 10, Line 12, Claim 8, delete "non transitory" and insert --non-transitory--.

Signed and Sealed this
Fourteenth Day of May, 2013

Teresa Stanek Rea
*Acting Director of the United States Patent and Trademark Office*